Aug. 29, 1950 — J. B. MOORE — 2,520,557
RAIN GAUGE
Filed Sept. 13, 1946 — 2 Sheets-Sheet 2

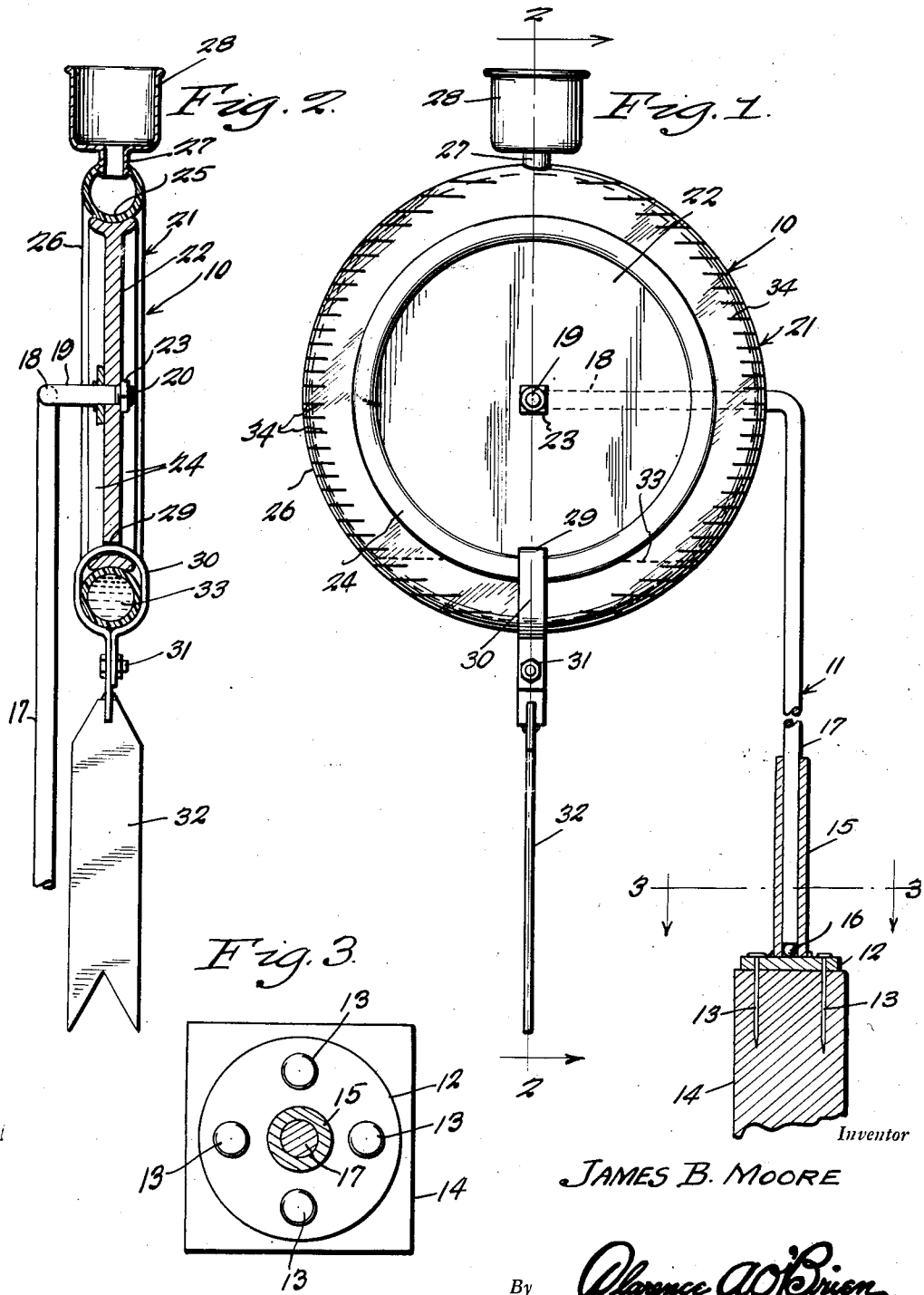

Inventor
JAMES B. MOORE
By Clarence A. O'Brien
and Harvey B. Jacobson
Attorneys

Patented Aug. 29, 1950

2,520,557

UNITED STATES PATENT OFFICE 2,520,557

RAIN GAUGE

James B. Moore, Hamilton, Mo.

Application September 13, 1946, Serial No. 696,666

5 Claims. (Cl. 73—171)

This invention relates to new and useful improvements and structural refinements in rain gauges, more specifically, to improvements in the rain gauge U. S. Patent No. 2,384,954, issued to me on September 18, 1945.

While experimenting with the rain gauge constructed in accordance with this patent, it has been found that the same lends itself to certain structural and functional improvements, whereby the construction thereof may be considerably simplified and its efficiency substantially increased.

It is, therefore, the principal object of the present invention to provide a device of the character herein described, in which such improvements are incorporated.

A further object of the invention is to provide a rain gauge which will readily adjust itself to face, so to speak, the direction of the wind driven rain.

Another object of the invention is to provide a rain gauge wherein the rain is received in transparent, graduated collecting units, in order that the quantity of the fallen rain may be easily and conveniently determined.

An additional object of the invention is to provide a rain gauge which is simple in construction and operation.

A still further object of the invention is to provide a rain gauge which will not easily become damaged and which will readily lend itself to economical manufacture.

With the above more important objects in view, and such other objects as may become apparent as this specification proceeds, the invention consists essentially of the arrangement and construction of parts as illustrated in the accompanying drawings, in which:

Figure 1 is a side elevation of the invention.

Figure 2 is a cross-sectional view, taken substantially in the plane of the line 2—2 in Figure 1.

Figure 3 is a cross-sectional view, taken substantially in the plane of the line 3—3 in Figure 1.

Like characters of reference are used to designate like parts in the specification and throughout the several views.

Figure 5:
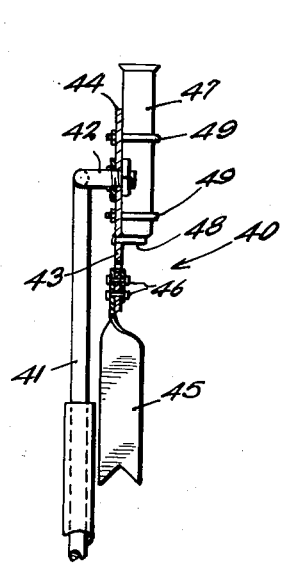
Figure 5 is a cross-sectional view, taken substantially in the plane of the line 5—5 in Figure 4.

Referring now to the accompanying drawings in detail, more particularly, to Figures 1, 2 and 3, the invention consists of a rain gauge designated generally by the reference character 10, the same embodying in its construction a rotatable support designated generally by the character 11, and comprising a disc-like base plate 12, secured by means of the nails 13, or the like, to suitable supporting structure, such as an upright pole 14.

An upright tube 15 is welded or otherwise suitably secured to the base plate 12 and a ball bearing 16 is rotatably positioned in the lower end of the tube, as is best shown in Figure 1. The lower end portion of an upright supporting rod 17 is rotatably inserted into the tube 15, the lower extremity of the rod engaging the bearing 16, whereby free rotation of the rod in the tube is facilitated.

The upper end portion of the rod 17 is laterally angulated as at 18 and terminates in a horizontal, right angles portion 19 which is screw threaded at the extremity thereof, as at 20.

The rain collecting unit designated generally by the character 21 consists of a substantially circular plate 22 which is rotatably mounted on the horizontal end portion 19 of the rod 17 and is retained thereon by means of a suitable nut 23 positioned on the threaded portion 20. The plate 22 is formed with a concave peripheric flange 24, providing a shallow groove 25, and an annular tube-like member 26, formed from transparent material, is positioned in this groove, as is best shown in Figure 2.

The member 26 is formed in the outer, lateral surface thereof with a screw threaded bore to receive a threaded shank 27 of a collector cup 28 and the plate 22 is provided with a suitable slot 29 through which a clamping strap 30 may be passed to encircle the flange 24 and the body 26, as is best shown in Figure 2.

It will be noted that the strap 30 is disposed in a diametrically opposite relationship on the member 26 with respect to the cup 28 and that the end portions of the strap are secured together by a suitable bolt and nut 31. A balancing fin 32, configurated substantially as shown, is secured to one end portion of the strap 30, said fin being disposed transversely with respect to the plane of the plate 22, as will be clearly understood.

When the invention is placed in use, the collecting unit 21 as a whole, will function in the manner of a weather vane, that is, wind pressure against the surfaces of the plate 22 will cause the rod 17 to rotate in the tube 15 until the plane of the plate 22 is parallel to the direction of the wind.

Furthermore, the wind pressure upon the fin 32 will tilt the unit 21 on its pivot 19 so that the open mouth of the cup 28 faces the direction of the wind driven rain. The cup will, of course, receive the rain and deliver the same into the tubular member 26, as indicated by the lines 33. The amount of rain fall may then be easily and conveniently measured with respect to predetermined graduations 34 inscribed on the member 26. In the absence of wind, the fin 32 will effectively maintain the unit 21 in a vertical position, that is, with the mouth of the cup 28 directed upwardly, substantially as shown.

Figure 4:
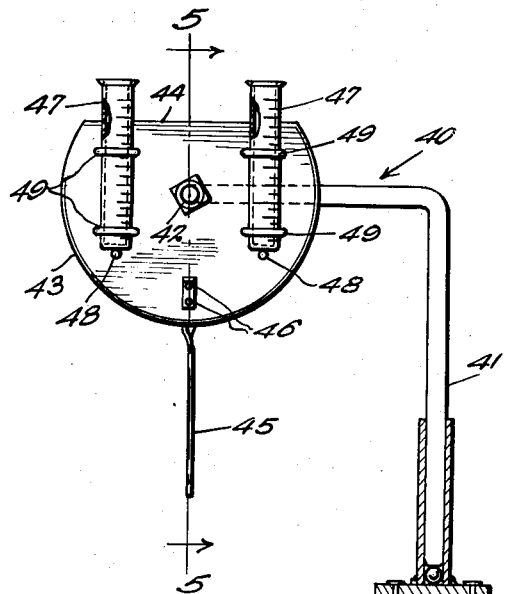
Figure 4 is a side elevation of a modified embodiment of the invention.

Referring now to the modified embodiment of the invention illustrated in the accompanying Figures 4 and 5, the rain gauge designated generally by the reference character 40 consists of a rotatable support 41, similar in all respects to the afore-mentioned support 11.

The support 41 includes a horizontally disposed rod portion 42 on which a substantially circular plate 43 is rotatably mounted. A segment of this plate is removed so as to provide a chordal edge 44 and a balancing fin 45, configurated substantially as shown, is secured as at 46 to the plate 43, in a diametrically opposed relation to the edge 44.

A pair of transparent, graduated tubes 47 are secured to the plate 43 at the diametrically opposed sides of the pivot 42, the upper ends or mouths of the tubes being open and the closed lower ends thereof resting upon suitable supporting pins 48 provided in the plate 43. The tubes 47 are secured to the plate by means of U-shaped clamps 49, as will be clearly apparent.

When this embodiment of the invention is placed in use, the plate 43 will possess the characteristics of a weather vane, as has already been described in connection with the plate 22. The fin 45, responding to wind pressure, will tilt the plate 43 and the associated tubes 47 toward the wind driven rain, so that the rain may be collected in the graduated tubes and the quantity thereof correspondingly determined. It will be noted that the relative disposition of the tubes 47 upon the plate 43 and the provision of the fin 45 will effectively maintain the device in an upright position in the absence of wind.

Figure 7:
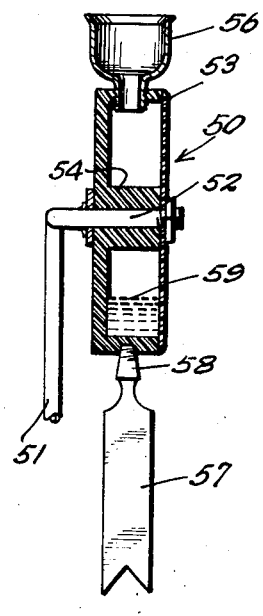
Figure 7 is a cross-sectional view, taken substantially in the plane of the line 7—7 in Figure 6.
Figure 6:
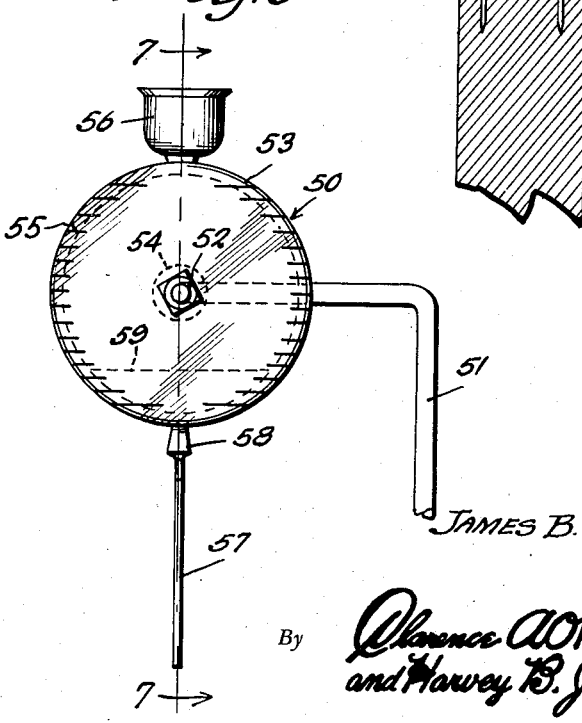
Figure 6 is a side elevation of a further modified embodiment of the invention.

With reference now to the further modified embodiment of the invention illustrated in the accompanying Figures 6 and 7, the rain gauge 50 herein includes a rotatable support 51, similar to the afore-mentioned supports 41 and 11.

The support includes a horizontal rod portion 52 and a hollow, disc-like body 53 is rotatably mounted on this portion as will be clearly apparent. The body 53 is formed from transparent material and is provided with a central boss 54, whereby the mounting thereof on the portion 52 is facilitated.

The body 53 is also inscribed with suitable graduations 55 and is provided in the lateral surface thereof with a collecting cup 56. A balancing fin 57, equipped with an attaching adapter 58 is secured to the body 53, in a diametrically opposed relation with respect to the cup 56, as is best shown in Figure 6.

When this embodiment of the invention is placed in use, the body 53 will function as a weather vane, responding to the wind pressure upon its flat end surfaces. As in the foregoing embodiments, the fin 57 will tilt the body 53 and the mouth of the collecting cup 56 toward the wind driven rain, so that the rain will be collected in the body as indicated at 59.

It is believed that the advantages and use of the invention will be clearly understood from the foregoing disclosure, and accordingly, further description thereof at this point is considered unnecessary.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

1. In a rain gauge, the combination of a support arm rotatable in a horizontal plane, a disc-like member rotatably mounted at one end of said arm, said member having vertical wind-resisting surfaces disposed parallel to said arm, a downwardly extending balancing fin provided on said member at right angles to said surfaces, and rain collecting receptacle means carried by said member.

2. A rain gauge comprising a rotatably mounted upright rod having a horizontally angulated arm at the upper end thereof, a disc-like member pivotally mounted on said arm, said member having vertical wind-resisting surfaces disposed parallel to said arm, a downwardly extending balancing fin provided on said member at right angles to said surfaces, and a pair of rain collecting receptacles secured to said member at diametrically opposite sides of its pivotal mounting on said arm.

3. The device as defined in claim 2 wherein said receptacles comprise graduated tubes having upwardly directed open end portions extending beyond the upper edge of said member.

4. A rain gauge comprising in combination, a rotatably mounted upright supporting rod having a horizontally angulated upper end portion, a collecting unit including a substantially circular plate mounted for rotation about a horizontal axis on said upper end portion of said rod and disposed in a plane substantially parallel to said upper end portion whereby said rod may be rotated by wind pressure on said plate, an annular tube-like member secured at the periphery of said plate and inscribed with a series of graduations, a collecting cup provided on and communicating with the interior of said member, and a substantially flat balancing fin secured to and depending from said collecting unit, said fin being disposed at right angles to the plane of rotation of said plate and being responsive to wind pressure whereby said unit may be rotated and said cup tilted in the direction of wind driven rain.

5. A rain gauge comprising in combination, a rotatably mounted upright supporting rod having a horizontally angulated upper end portion, a collecting unit comprising a hollow disc-like body provided with a series of graduations, said body being mounted for rotation about a horizontal axis on said upper end portion of said rod and disposed in a plane substantially parallel to said upper end portion whereby said rod may be rotated by wind pressure on said body, a collecting cup provided on and communicating with the interior of said body, and a substantially flat balancing fin secured to and depending from said collecting unit, said fin being disposed at right angles to the plane of rotation of said body and being responsive to wind pressure whereby said unit may be rotated and said cup tilted in the direction of wind driven rain.

JAMES B. MOORE.

REFERENCES CITED

The following references are of record in the file of this patent:

UNITED STATES PATENTS

| Number | Name | Date |
|---|---|---|
| 916,060 | Thomson | Mar. 23, 1909 |
| 1,118,259 | Beard | Nov. 24, 1914 |
| 1,942,039 | Tyler | Jan. 2, 1934 |
| 2,384,954 | Moore | Sept. 18, 1945 |